US009268738B2

(12) United States Patent
Barowski et al.

(10) Patent No.: US 9,268,738 B2
(45) Date of Patent: Feb. 23, 2016

(54) THREE-DIMENSIONAL PERMUTE UNIT FOR A SINGLE-INSTRUCTION MULTIPLE-DATA PROCESSOR

(71) Applicant: INTERNATIONAL BUSINESS MACHINES CORPORATION, Armonk, NY (US)

(72) Inventors: Harry Barowski, Boeblingen (DE); Tim Niggemeier, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 13/775,355

(22) Filed: Feb. 25, 2013

(65) Prior Publication Data

US 2013/0227249 A1    Aug. 29, 2013

(30) Foreign Application Priority Data

Feb. 24, 2012  (EP) .................................... 12156778

(51) Int. Cl.
| G06F 15/00 | (2006.01) |
| G06F 7/00 | (2006.01) |
| G06F 15/80 | (2006.01) |
| G06F 9/30 | (2006.01) |

(52) U.S. Cl.
CPC .......... *G06F 15/803* (2013.01); *G06F 9/30032* (2013.01); *G06F 9/30036* (2013.01); *G06F 9/30109* (2013.01); *G06F 9/30141* (2013.01); *G06F 15/8053* (2013.01)

(58) Field of Classification Search
None
See application file for complete search history.

(56) References Cited

U.S. PATENT DOCUMENTS

| 5,794,059 A * | 8/1998 | Barker ................. G06F 9/30036 712/1 |
| 2007/0011220 A1* | 1/2007 | Leenstra ................. G06F 7/766 708/420 |
| 2008/0130871 A1* | 6/2008 | Gemmeke ........... G06F 13/4217 380/28 |
| 2008/0253085 A1 | 10/2008 | Soffer |
| 2009/0212407 A1* | 8/2009 | Foster .................... B81B 7/0006 257/686 |
| 2010/0271071 A1* | 10/2010 | Bartley ............... G06F 17/5068 326/101 |
| 2011/0119508 A1 | 5/2011 | Heller, Jr. |

OTHER PUBLICATIONS

Black et al. (Die Stacking (3D) Microarchitecture, Dec. 2006, pp. 1-11).*
Funaya et al. (3D On-chip Memory for the Vector Architecture, Sep. 2009, pp. 1-6).*

* cited by examiner

*Primary Examiner* — George Giroux
(74) *Attorney, Agent, or Firm* — Eustace P. Isidore; Yudell Isidore PLLC (57) ABSTRACT

A three-dimensional (3D) permute unit for a single-instruction-multiple-data stacked processor includes a first vector permute subunit and a second vector permute subunit. The first and second vector permute subunits are arranged in different layers of a 3D chip package. The vector permute subunits are each configured to process a portion of at least two input vectors. A first contact sub-field of the first vector permute subunit is configured to connect output ports of a first crossbar of the first vector permute subunit, holding an intermediate result of the first vector permute subunit, to a second contact sub-field of the second vector permute subunit. A first contact sub-field of the second vector permute subunit is configured to connect output ports of a first crossbar of the second vector permute subunit, holding an intermediate result of the second vector permute subunit, to a second contact sub-field of the first vector permute subunit.

21 Claims, 4 Drawing Sheets

|     | byte 10 | | | | | | | | | | | | | | | byte 1F |
|---|---|---|---|---|---|---|---|---|---|---|---|---|---|---|---|---|
| 332 | 65 | 66 | 67 | 68 | 69 | 6A | 6B | 6C | AA | BB | CC | DD | EE | FF | 00 | 88 |

|     | byte 30 | | | | | | | | | | | | | | | byte 3F |
|---|---|---|---|---|---|---|---|---|---|---|---|---|---|---|---|---|
| 334 | 12 | 34 | 56 | 78 | 90 | AB | CD | EF | 11 | 22 | 33 | 44 | 55 | 66 | 77 | 99 |
| 336 | 00 | 38 | 22 | 3A | 3B | 3C | 3D | 3E | 1F | 3F | 18 | 19 | 1A | 1B | 1C | 1D |
| 338 | 38 | -- | 3A | 3B | 3C | 3D | 3F | 3E | 1F | 3F | 18 | 19 | 1A | 1B | 1C | 1D |
| 340 | -- | 11 | -- | 33 | 44 | 55 | 66 | 77 | 88 | 99 | AA | BB | CC | D | EE | FF |
| 344 | / | / | / | / | / | / | / | / | 38 | 39 | 3A | 3B | 3C | 3D | 3E | 3F |
| 344 | / | / | / | / | / | / | / | / | 11 | 22 | 33 | 44 | 55 | 66 | 77 | 99 |
| 346 | 0 | - | 1 | - | - | - | - | - | - | - | - | - | - | - | - | - |
| 348 | 00 |   | 22 |   |   |   |   |   |   |   |   |   |   |   |   |   |
| 350 | 1 | 0 | 1 | 0 | 0 | 0 | 0 | 0 | 0 | 0 | 0 | 0 | 0 | 0 | 0 | 0 |
| 352 | 00 | 11 | 22 | 33 | 44 | 55 | 66 | 77 | 88 | 99 | AA | BB | CC | DD | EE | FF |

FIG. 3b

THREE-DIMENSIONAL PERMUTE UNIT FOR A SINGLE-INSTRUCTION MULTIPLE-DATA PROCESSOR This application claims priority to European Patent Application No. EP12156778, entitled "3D PERMUTE UNIT FOR AN SIMD PROCESSOR," filed Feb. 24, 2012, the disclosure of which is hereby incorporated herein by reference it its entirety for all purposes.

BACKGROUND

The disclosure is generally directed to a single-instruction multiple-data (SIMD) processor and, more specifically, to a three-dimensional permute unit for an SIMD processor.

A vector permute unit is one of the fundamental functional blocks of a central processing unit (CPU) or processor. A vector permute unit enables a bit-wise or byte-wise exchange of individual bits or bytes within a data word of a processor. In other words, bytes may be permuted in a data word by a permute unit. In particular, a vector permute unit may be used to align and re-sort data into vectors, which may be used as input operands for parallel single-instruction multiple-data (SIMD) execution units. As one example, each byte of, for example, two 128-bit wide operands may be permutated into a 128-bit wide result vector byte-wise on byte boundaries. If an operand length is limited to 128 bits, a conventional vector permute unit may only support 128-bit SIMD operations, which is equivalent to four 32-bit operands.

To support future applications of 4-way double precision floating point operations or S-way SIMD 32-bit integer operations, the width of the data paths of a vector permute unit needs to be doubled. For example, two 256-bit input operands may be concatenated to provide a 512-bit wide input vector. The result may then be a 256-bit vector as a consequence of a byte-wise permutation of the source operands into a 32-byte result vector. State-of-the-art extensions to permute units would require that a crossbar be built as combinations of multilevel 8-bit multiplexers. In this case, the number of logic gates may be increased by a factor of four and data paths may suffer from wire length increase and fan-out. In this case, the performance of an extended crossbar supporting 512-bit to 256-bit byte-wise vector permutation may be dramatically reduced. For example, instead of a one cycle operation of the crossbar, latency may increase to three cycles.

A number of conventional approaches have been employed to handle increased data throughput and packaging. For example, U.S. Patent Application Publication No. 2008/0253085 discloses a 3-dimensional (3D) multi-layer modular computer architecture that improves computer mass, volume, and power densities through the use of 3D layered structures. As another example, U.S. Patent Application Publication No. 2011/0119508 discloses a computing system having a stack of microprocessor chips that are designed to work together in a multiprocessor system. The chips are interconnected with 3D through-vias, or alternatively by compatible package carriers that provide interconnections (logically the chips in a stack are interconnected via specialized cache coherent interconnections).

BRIEF SUMMARY

A three-dimensional (3D) permute unit for a single-instruction-multiple-data stacked processor includes a first vector permute subunit and a second vector permute subunit. The first and second vector permute subunits are arranged in different layers of a 3D chip package. The vector permute subunits are each configured to process a portion of at least two input vectors. A first contact sub-field of the first vector permute subunit is configured to connect output ports of a first crossbar of the first vector permute subunit, holding an intermediate result of the first vector permute subunit, to a second contact sub-field of the second vector permute subunit. A first contact sub-field of the second vector permute subunit is configured to connect output ports of a first crossbar of the second vector permute subunit, holding an intermediate result of the second vector permute subunit, to a second contact sub-field of the first vector permute subunit.

The first crossbar of the first vector permute subunit is connected to a first input port and a second input port of the first vector permute subunit on one side and the first contact sub-field of the first vector permute unit on an opposite side. The first crossbar of the second vector permute subunit is connected to a first input port and a second input port of the second vector permute subunit on one side and the first contact sub-field of the second vector permute subunit on an opposite side. The first contact sub-field of the first vector permute subunit and the second contact sub-field of the second vector permute subunit are connected via a first set of electrical contacts. The first contact sub-field of the second vector permute subunit and the second contact sub-field of the first vector permute subunit are connected via a second set of electrical contacts such that the input vectors are partially processed in the first vector permute subunit and partially processed in the second vector permute subunit to provide a combined result for the 3D permute unit.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a three-dimensional (3D) permute unit for a single-instruction multiple-data (SIMD) processor.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

According to one embodiment of the invention, a three-dimensional (3D) permute unit for an SIMD processor for a single-instruction multiple-data stacked processor system is provided. In one or more embodiments, the 3D permute unit includes first and second vector permute subunits arranged in different layers, e.g., separate physical layers, of a 3D chip package. In this case, each vector permute subunit may be configured to process a portion of several input vectors. The 3D permute unit also includes a first contact sub-field of the first vector permute subunit configured to connect output ports of a first crossbar of the first vector permute subunit (holding intermediate results of the first vector permute subunit) to a second contact sub-field of the second vector permute subunit. The 3D permute unit further includes a first contact sub-field of the second vector permute subunit configured to connect output ports of a first crossbar of the second vector permute subunit (holding intermediate results of the second vector permute subunit) to a second contact sub-field of the first vector permute subunit.

In various embodiments, the processing of a portion of several input vectors may be based on a control vector. The first crossbar of the first vector permute subunit may be connected to a first input port and a second input port of the first vector permute subunit on one side and the first contact sub-field of the first vector permute unit on the other side. The first crossbar of the second vector permute subunit may be connected to a first input port and a second input port of the second vector permute subunit on one side and the first contact sub-field of the second vector permute subunit on the other side. The first contact sub-field of the first vector permute subunit and the second contact sub-field of the second contact sub-field may be connected via a first set of electrical contacts and the first contact sub-field of the second vector permute subunit and the second contact sub-field of the first vector permute subunit may be connected via a second set of electrical contacts. The input vectors are partially processed in the first vector permute subunit and partially processed in the second vector permute subunit resulting in a combined result of the 3D permute unit.

According to another embodiment, a method for width expansion of processable input vectors from a first vector length (e.g., 128 bits) to a second vector length (e.g., 256 bits) for a 3D permute unit of a single-instruction multiple-data (SIMD) stacked processor sub-system is disclosed. For example, the second vector length may be twice as long as the first vector length. The method includes arranging first and second vector permute subunits in different layers of a 3D chip package. Each vector permute subunit may be configured to process a portion of each of the input vectors. The method also includes connecting output ports of a first crossbar of the first vector permute subunit (holding intermediate results of a first crossbar of the first vector permute subunit) via a first contact sub-field of the first vector permute subunit to a second contact sub-field of the second vector permute subunit.

In one or more embodiments, the method also includes connecting output ports of a first crossbar of the second vector permute subunit (holding intermediate result of a first crossbar of the second vector permute subunit) via a first contact sub-field of the second vector permute subunit to a second contact sub-field of the first vector permute subunit. The method may further include connecting a first crossbar of the first vector permute subunit between a first and a second input port of the first vector permute subunit on one side and the first contact sub-field of the first vector permute subunit on the other side and connecting a first crossbar of the second vector permute subunit between a first and a second input port of the second vector permute subunit on one side and the first contact sub-field of the second vector permute subunit on the other side. The first contact sub-field of the first vector permute subunit and the second contact sub-field of the second vector permute subunit are connected via a first set of electrical contacts and the first contact sub-field of the second vector permute subunit and the second contact sub-field of the first vector permute subunit are connected via a second set electrical contacts. The input vectors are partially processed in the first vector permute subunit and partially processed in the second vector permute subunit resulting in a combined result of the 3D permute unit.

It should be appreciated that the 3D permute unit and the layering may also be used for any other vector length or width, respectively. In various embodiments, each of the portions of each of the input vectors may equal one-half of a data vector, e.g., 128 bits each. It should be appreciated that other vector lengths may be selected. The organization of contact sub-fields and electrical contacts may, in particular, be arranged such that a minimum number of required electrical contacts from the first contact sub-field to the second contact sub-field are necessary. The sets of contact sub-fields may, for example, also be treated as one contact field as a contact matrix in order to keep data paths as short as possible. While 256-bit wide data vectors are discussed, it should be appreciated that other vector lengths are possible.

In the context of this specification, the term '3D permute unit' denotes a subunit of a computer system. In general, in every CPU there is a need for bit or byte permutations. The term 'single-instruction-multiple-data', as used herein, denotes a special architecture of a CPU that is able to operate on different input vectors at the same time, i.e., combine the input vectors in any form. Typically, a third input may also be used in order to define how the input vectors may be treated, e.g., how they may be permuted. The term 'stacked processor system' denotes a processor system that may have elements in different physical layers in a 3D room. Several subcomponents of a processor or parts of the processor may be stacked physically on one another. As used herein, the term 'vector permute subunit' may denote one component of a complete vector permute unit. A vector permute unit may include, for example, two, three, four, or even more stacked vector permute subunits. The term '3D chip package', as used herein, denotes a 3D structure of computer chips, which may be vector permute subunits.

The term 'control vector', as used herein, denotes a third input data vector defining how to treat the other input vectors. As used herein, the term 'contact sub-field' denotes a field of contacts on one layer of a 3D stacked chip package. The contacts may be connected to electric/electronic components on each layer. The term 'sub-field', as used herein denotes that a field that may be a portion of a larger field that may actually be organized in a regular matrix. As used herein, the term 'through-silicon-via (TSV)' denotes a special form of electrical interconnect that connects devices in one layer of a 3D chip package to devices in another layer of the 3D chip package. Contacts that may be arranged in the surface of a layer may need to be connected to a layer below an upper layer. As such, a sort of wire needs to penetrate the upper silicon layer to reach contacts that may be on top of a semiconductor layer positioned below the upper layer. The wires may be called 'vias' and may be used for silicon layers having their active components oriented into one room direction, i.e., the layers may be arranged face-to-bottom where one surface faces a bottom side of another layer. In cases where the active layers may be arranged face-to-face, contacts from one layer to another layer may be established by a grid of solder-balls or equivalent contact mechanism.

As used herein, the term 'crossbar' (also referred to as cross-point switch or matrix switch) denotes a switch for one or more electrical lines that may connect multiple input lines to multiple output lines. A crossbar may be implemented in the form of a multiplexer. For example, a crossbar may alternatively switch two possible input signals to one output signal. A crossbar may also work byte-wise meaning several bytes of input data may be switched to one byte of output data. It should be appreciated that the relationship or sequence of the bits of each input byte to the bits of each output byte are not altered in such an operation. As used herein, the term 'multiplexer' may denote a device to switch several input signals to one or more output signals. In the context of this application, the term many-to-one multiplexer or crossbar may be used to mean that one out of several input signals is selected as the only output signal. Input signals, as well as output signals, may be several bits wide, e.g., a byte.

The disclosed 3D permute unit for an SIMD processor offers various advantages. For example, the structure of the 3D permute unit allows for a separate data transport on each layer. As such, data preparation may be performed in parallel. A pre-arrangement of bytes to be permuted may be performed before an exchange with bytes of another layer of the 3D permute unit. As another example, fan-out on data signals may be reduced and wire length may be reduced enabling a faster timing of a circuit. A reduced amount of horizontal wires also reduces line capacitance. Overall, the complexity of a circuit may be reduced. If a complete permutation of all input vector bytes is not necessary, data preparation on each layer may be reduced to potentially facilitate reduced complexity of a TSV matrix, crossbars, and multiplexers and to facilitate a reduced size and a reduced number of contacts. Reducing data preparation on a layer may also reduce production costs and increase a yield of a related semiconductor production process. The positioning of layers on each other may also reduce required horizontal space, making it possible to reduce overall space requirements for permutation units in CPUs. This may enhance an integration factor and facilitate further miniaturization.

According to one embodiment, each input vector for a 3D permute unit is 256 bits wide. However, other word sizes are possible, e.g., 32, 64, 128, 512, etc., which may enable a doubling of actual input vector sizes using existing technology without the requirement of redesigning permute units completely in order to double the input vector width of permutation units. According to a further embodiment of the 3D permute unit, the first vector permute subunit may include a second crossbar connected between the first input port and a second input port of the first vector permute subunit on one side and a first input port of an output multiplexer of the first vector permute subunit on the other side. The individual crossbar function may be controlled by the control vector input to the 3D permute unit. The second crossbar may permute either the lower or the upper vector half of the input vectors depending on the layer of the 3D permute unit.

According to another embodiment of the 3D permute unit, the second vector permute subunit may include a second crossbar connected between the first input port and a second input port of the second vector permute subunit on one side and a first input port of an output multiplexer of the second vector permute subunit on the other side. As previously noted, the function of the crossbar may be controlled by a control vector. According to one embodiment of the 3D permute unit, the first vector permute subunit includes a third crossbar connected between the second contact sub-field of the first vector permute subunit and a second input port of the output multiplexer of the first vector permute subunit. In this manner, intermediate results of one layer of the 3D permute unit may be permuted with intermediate results of another layer of the 3D permute unit. According to another embodiment of the 3D permute unit, the second vector permute subunit includes a third crossbar connected between the second contact sub-field of the second vector permute subunit and a second input port of the output multiplexer of the second vector permute subunit. This arrangement may be equivalent to the one relating to the other layer of the 3D permute unit.

According to a further embodiment of the 3D permute unit, the first input port of the first vector permute subunit may be configured to receive a lower half of bits of a first input vector. The second input port of the first vector permute subunit may be configured to receive a lower half of bits of a second input vector. This may further enhance the interchange of bytes from one layer of the 3D permute unit to another layer of the 3D permute unit. According to another embodiment of the 3D permute unit, the first input port of the second vector permute subunit may be configured to receive an upper half of bits of the first input vector (e.g., bits 0 to 127) and the second input port of the second vector permute subunit may be configured to receive an upper half of bits of the second input vector (e.g., bits 128 to 255). Thus, the lower halves and the upper halves of the 3D permute unit may each be processed on different vector permute subunits of the 3D permute unit.

According to one embodiment of the 3D permute unit, the first crossbar of the first vector permute subunit may be configured to receive 'i' bytes from the first input port of the first vector permute subunit and (k+1−i) byte from the second input port of the first vector permute subunit, where i=1, . . . , k, and k equals one-half of the vector length in bytes resulting in a one byte input signal for the first contact sub-field of the first vector permute subunit. Such an arrangement may be symmetrical on the second vector permute unit. The organization of the first crossbar of the first vector permutes subunit, as well as the same in the second vector permute subunit, may allow a data preparation on one-half the input vector at a beginning of the permutation operation.

According to a further embodiment of the 3D permute unit, the output port of the output multiplexer of the first vector permute subunit may hold the lower half of bits of a vector permute operation of the input vectors and the output port of the output multiplexer of the second vector permute subunit may hold the upper half of bits of the vector permute operation of the input vectors. Thus, a complete permutation of bytes of the input vectors may be performed with a stacked 3D permute unit achieving the advantages mentioned above. It should be clear that more layers of the 3D permute unit may be stacked on each other. While this may use additional TSVs to further increase possible vector widths of input vectors, processing speed and room consumption would stay the same or may even be reduced. For example, a central processing unit for a computer system includes the 3D permute unit to provide CPUs with increased computing capacity and speed using subunits with a proven design.

Figure 1:
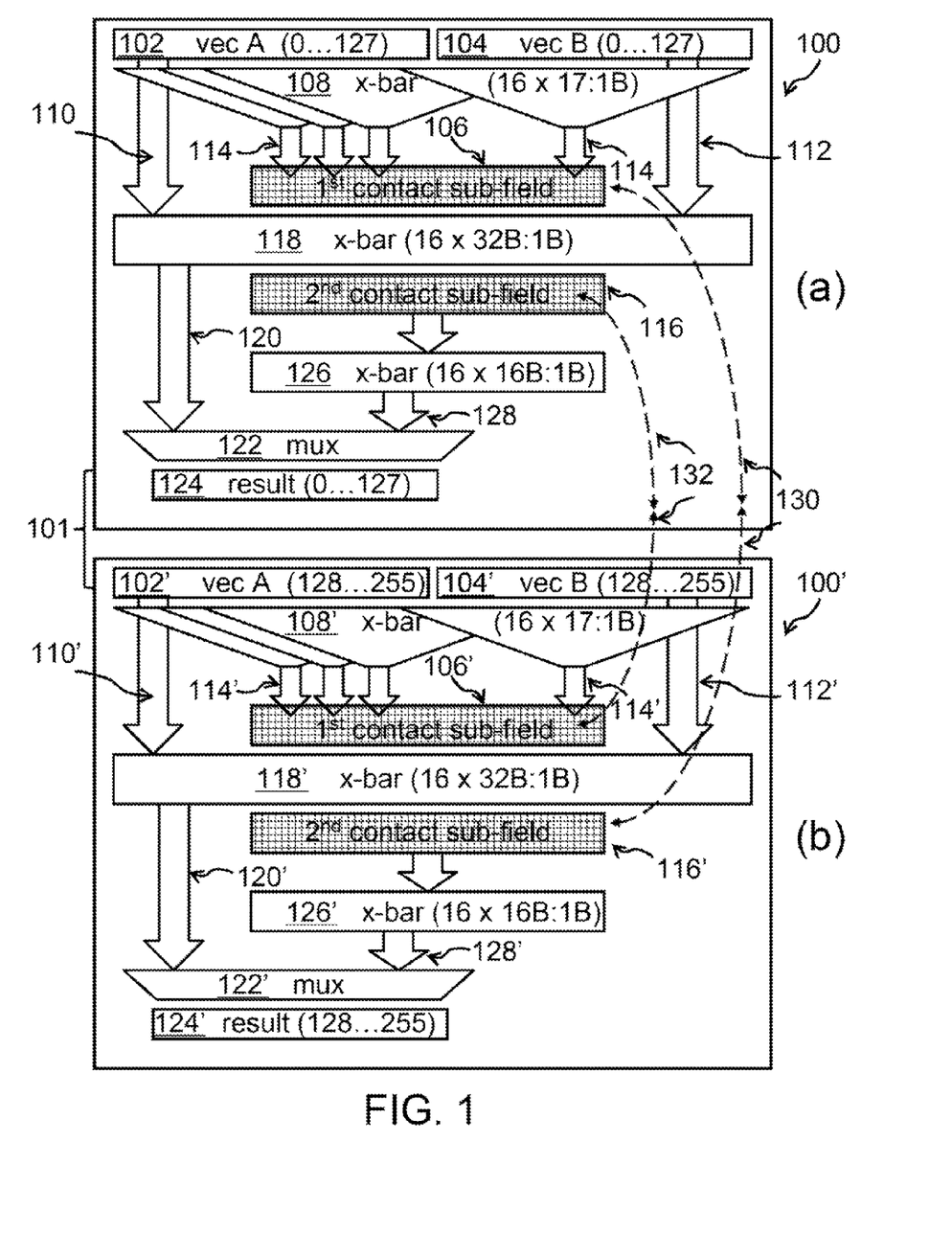
FIG. 1 illustrates exemplary layers of a three-dimensional (3D) permute unit configured according to an embodiment of the present disclosure.

FIG. 1 shows a block diagram of an embodiment of two layers of 3D permute unit 101. Corresponding elements of the layers have the same reference numeral but are differentiated by an apostrophe, as in 100 and 100'. In this example, a first vector permute subunit 100 may be positioned in an upper layer of a 3D chip package (FIG. 1 (*a*)), and a second vector permute subunit 100' may be positioned in a lower layer of the 3D chip package (FIG. 1 (*b*)). The different elements of the two vector permute subunits 100 and 100' are only mentioned here once as they may be positioned logically symmetrically, as well on the other layer. The description of the first vector permute subunit 100 also applies to the second vector permute subunit 100'. First vector permute subunit 100 may comprise two input ports, a first input port 102 for receiving a first input vector 'vec A', and a second input port 104 for receiving a second input vector 'vec B'.

Each of the input vectors 'vec A' and 'vec B' may have 256 bits, corresponding to 32 bytes. However, each input port, namely, the first and the second input port of each layer (or each vector permute subunit) may only be 128 bits wide. In this case, each of the input vectors 'vec A' and 'vec B' may be split into an upper and lower portion. The lower portion may relate to the lower 128 bits of a vector, e.g., bit 0 to 127, and the upper portion may relate to the upper 128 bits of a vector, e.g., bit 128 to 255. As can be recognized from FIG. 1 (*a*), the lower portion of each input vector 'vec A' and 'vec B' may be fed to the input ports of upper vector permute subunit 100. First input port 102 of first vector permute subunit 100 may receive bits 0 to 127 of the first input vector 'vec A' and second input port 104 of the first vector permute subunit 100 may receive bits 0 to 127 of the second input vector 'vec B'. Correspondingly, first input port 102' of second vector permute subunit 100' (corresponding to the lower vector permute subunit) may receive bits 128 to 255 of input vector 'vec A' and second input port 104' of second vector permute subunit 100' may receive bits 128 to 255 of input vector 'vec B'.

A first crossbar 108 is connected to input ports 102 and 104 as indicated. First crossbar 108 of first vector permute subunit 100 includes a series of multiplexers, e.g., in this case sixteen, which may each have seventeen input ports each being one byte wide. The right most multiplexer of crossbar 108 shows as input signals all sixteen bytes from second input port 104 of first vector permute subunit 100 plus one input byte from first input port 102 of first vector permute subunit 100. From this, one byte may be generated at the output of first crossbar 108, at data path 114, which leads to a first contact sub-field 106. The signal at the output of first crossbar 108 is an intermediate result of first vector permute subunit 100. Each bit line of data path 114 may be connected to one contact of first contact sub-field 106.

Only four multiplexers of first crossbar 108 are actually shown in FIG. 1 (*a*) as parallelograms. In total, sixteen multiplexers may be provided as the nomenclature also shows '16×17B:1B', which means sixteen times seventeen input bytes resulting in one output byte selected from the seventeen input bytes. In this case, the width of each of data paths 114 may be one byte wide. In general, first crossbar 108 of first vector permute subunit 100 may be configured to receive 'i' bytes from first input port 102 of first vector permute subunit 100 and (k+1−i) bytes from second input port 104 of first vector permute subunit 100, where i=1, . . . , 16, and 'k' equals half of the vector length in bytes (i.e., sixteen in this case) resulting in a one byte input signal for first contact sub-field 106 of first vector permute subunit 100. Of course, this may be symmetrical for second vector permute subunit 100'.

Additionally, there may be data paths 110 and 112 reaching from input ports 102 and 104 to a second crossbar 118. In second crossbar 118 there may be sixteen multiplexers with thirty-two bytes as input signals resulting in a one byte output per multiplexer (i.e., 16×32B:1B). It should be appreciated that 'B' stands for 'byte', as is conventional. In this case, data paths 110 and 112 may be sixteen bytes wide (i.e., 128 bits) and may include signals from input ports 102 and 104. A result may be delivered, via data path 120, that is sixteen bytes wide to an input port of an output multiplexer 122. Multiplexer 122 may deliver a one-hundred twenty-eight bit output signal at an output port of 3D permute unit 101 representing a lower one-hundred twenty-eight bits of an output vector of 3D permute unit 101, referred to as result 124. Correspondingly, the upper bits of the output vector of 3D permute unit 101' may be delivered as result 124' by output multiplexer 122' at an output port of 3D permute unit 101.

Furthermore, there may be a second contact sub-field 116 on vector permute subunit 100. However, contact sub-fields 106 and 116 may be understood as one contact matrix arranged on the surface of the upper vector permute subunit semiconductor die. Second contact sub-field 116 is connected to a third crossbar 126, which may include sixteen multiplexers with sixteen bytes input and one byte output (16×16B:1B). The output of third crossbar 126 may be connected to a second input port of the output multiplexer 122. Related data path 128 may be sixteen bytes wide. Crossbars 108, 118, and 126, as well as the function of output multiplexer 122, may be controlled by a control vector that defines the performance of the byte permutation (i.e. which byte is interchanged with which other byte of the input data to the 3D permute unit) to deliver the output vector.

Figure 2:
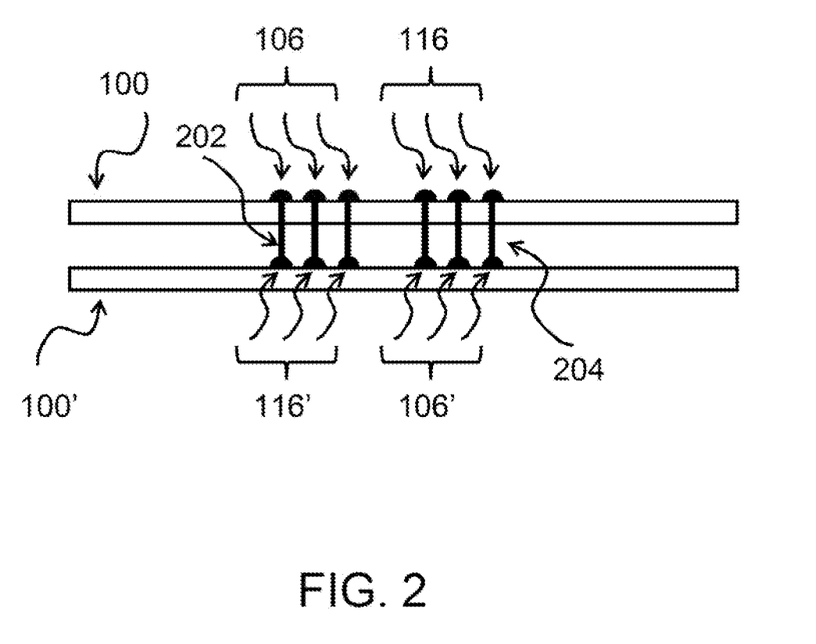
FIG. 2 depicts a diagram of a cross-section of exemplary through-silicon vias (TSVs).

As is shown, upper vector permute subunit 100 is connected to lower vector permute subunit 100'. First contact sub-field 106 of first vector permute unit 100 is connected to second contact sub-field 116' of second vector permute subunit 100' (as indicated by dotted line 130). This may be done bitwise such that corresponding bit lines may be connected to each other via electrical contacts, e.g., through-silicon-vias as indicated in FIG. 2. Similarly, first contact sub-field 106' of lower or second vector permute subunit 100' is connected to second contact sub-field 116 of upper vector permute subunit 100 (as indicated by dotted line 132). Thus, intermediate results of each of the vector permute subunits 100, 100' may be interchanged. The selection of which bytes may be interchanged or permuted may be controlled by a control vector, which may control the function of both crossbars and multiplexers of both vector permute subunits 100, 100'.

In general, FIG. 1 shows a 3D permute unit 101 for a single-instruction multiple-data stacked processor system that includes a first vector permute subunit 100 and a second vector permute subunit 100' arranged on each other in different physical layers of a 3D chip package. Each vector permute subunit 100, 100' may be configured to process a portion of each of the input vectors 'vec A' and 'vec B' based on a control vector. 3D permute unit 101 may further include a first contact sub-field 106 of first vector permute subunit 100 configured to connect ports holding intermediate results of first vector permute subunit 108 to a second contact sub-field 116' of second vector permute subunit 100'. A first contact sub-field 106' of second vector permute subunit 100' is configured to connect ports holding intermediate results of second vector permute subunit 100' to a second contact sub-field 116 of first vector permute subunit 100.

3D permute unit 101 may further include a first crossbar 108 of first vector permute subunit 100 connected to a first input port 102 and a second input port 104 of first vector permute subunit 100 on one side and first contact sub-field 106 of first vector permute unit 100 on an opposite side and a first crossbar 108' of second vector permute subunit 100' connected to a first input port 102' and a second input port 104' of second vector permute subunit 100' on one side and first contact sub-field 106' of second vector permute subunit 100' on an opposite side. First contact sub-field 106 of first vector permute subunit 100 and second contact sub-field 116' of second vector permute subunit 100' are connected via a first set of electrical contacts 202 and first contact sub-field 106' of second vector permute subunit 100' and second contact sub-field 116 of first contact sub-field 100 are connected via a second set of electrical contacts 204. For completeness it should be mentioned that the contact-fields and contact sub-fields may be organized as matrixes, i.e., contact sub-matrixes.

FIG. 2 shows schematically a cross-section of through-silicon-vias (TSVs) related to the contact sub-fields on two layers of a 3D permute unit. 3D permute subunits 100 and 100' are shown. Each contact sub-field is symbolically shown with only three contacts. It should be appreciated that the number of contacts (e.g., arranged in a matrix) may be greater than or less than three. The through-silicon-vias are shown as a first set of electrical contacts 202 and a second set of electrical contacts 204 that extend through an upper layer, i.e. first vector permute subunit 100, to a contact field on a lower layer, i.e. a second vector permute subunit 100'. First set of electrical contacts 202 connects first contact sub-field 106 of first vector permute subunit 100 and second contact sub-field 116' of second vector permute subunit 100'. Second set of electrical contacts 204 connect first contact sub-field 106' of second vector permute subunit 100' and second contact sub-field 116 of first contact sub-field 100. It should be appreciated that other contacting options are possible.

Although the contacting between layers of a 3D permute unit has been discussed and shown using TSVs, electrical contact between layers, i.e., between vector permute subunits, may also be achieved by contact ball-grids of solder-balls or an equivalent contact mechanism. For such an arrangement, vector permute subunits 100, 100' may physically be arranged face-to-face, e.g., with respective surfaces having active components facing each other. In this case, contact sub-fields may be arranged in mirrored orientation compared to contacts using TSVs. Such an arrangement may be most suitable for two vector permute subunits. If more vector permute subunits are present certain layers, i.e., layers arranged face-to-face, may contact each other via tin-balls or solder-balls. Other layers arranged face-to-bottom to each other may contact using TSVs.

Figure 3A:
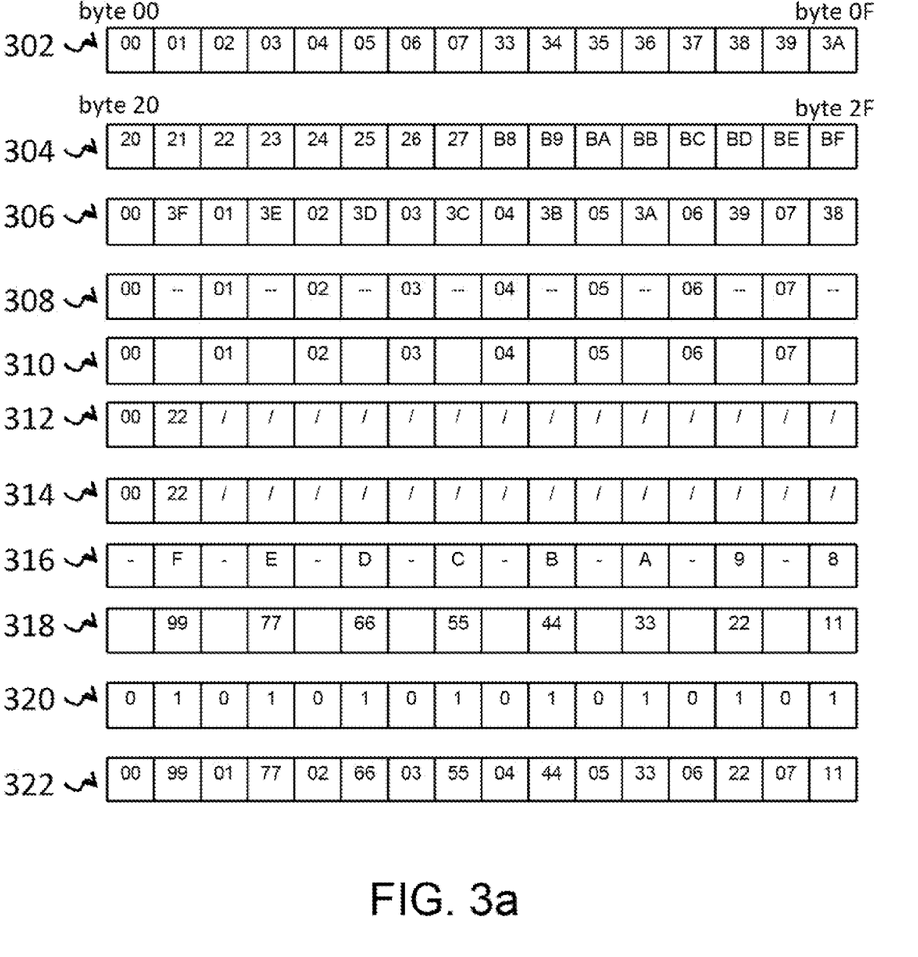
FIG. 3a illustrates exemplary information flow through a first vector permute subunit configured according to the present disclosure.
Figure 3B:
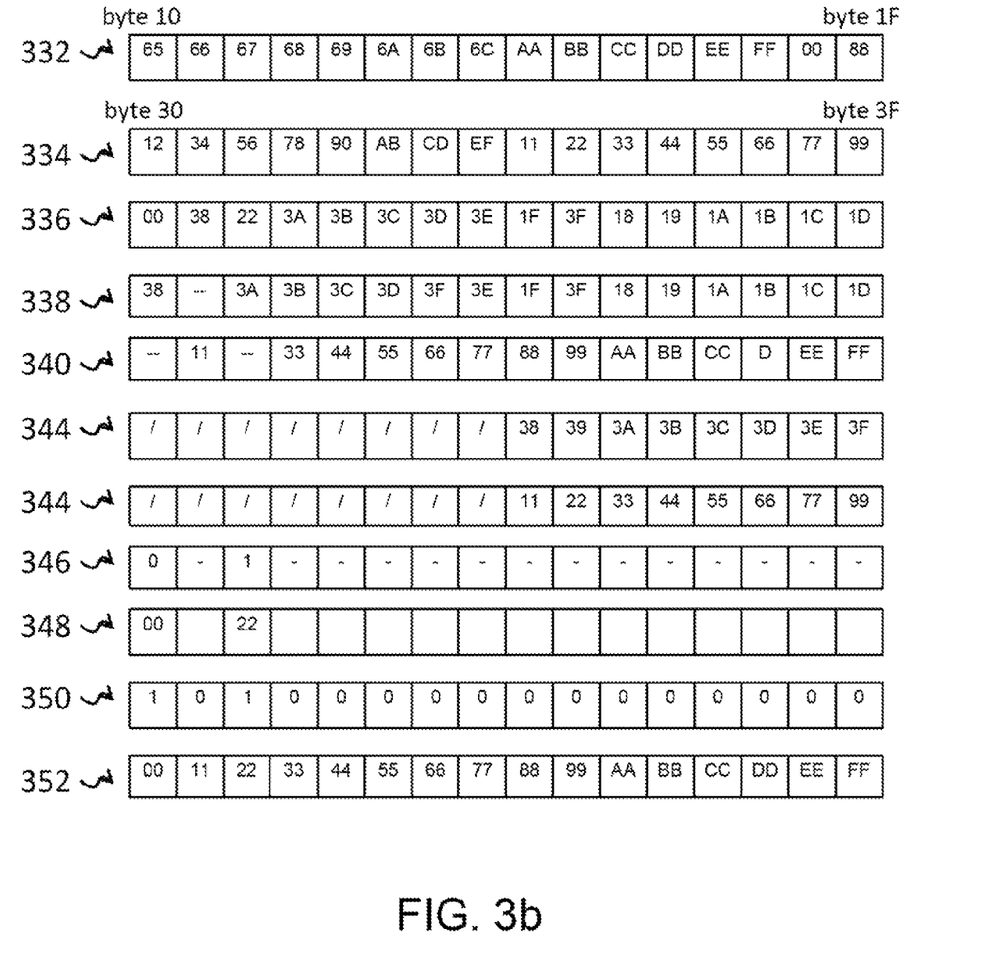
FIG. 3b illustrates an exemplary information flow through a second vector permute subunit configured according to the present disclosure.

FIGS. 3*a*, *b* show exemplary information flow through first and the second vector permute subunits, respectively. For easier readability, the reference numerals and their meaning are shown in Table 1 for the first vector permute subunit 100.

TABLE 1

| reference numeral | Meaning |
| --- | --- |
| 302 | content of first half of first input vector (vec A) to first vector permute subunit |
| 304 | content of first half of second input vector (vec B) to first vector permute subunit |
| 306 | 1$^{st}$ half of control vector |

TABLE 1-continued

| reference numeral | Meaning |
| --- | --- |
| 308 | control signal for the second x-bar 118 |
| 310 | data signal at data path 120 |
| 312 | control signal for the first x-bar 108 |
| 314 | TSV data from contact sub-fields 106 to 116' |
| 316 | control signal for third x-bar 126 |
| 318 | output signal of third x-bar 126 |
| 320 | control signal of 2:1 output multiplexer 122 |
| 322 | result 124 of first vector permute subunit |

As an example, reference numeral 302 denotes the first "byte 0" of the first input vector 'vec A' to first input 102 to first vector permute subunit 100 in hexadecimal notation, which may be used for all data and control signals. In this context, '-', 'or'. '–' means 'don't care'. In total, each horizontal row represents 128 bits, with the exception of reference numeral 320.

Reference numerals and their meanings for second vector permute subunit 100' are shown in Table 2.

TABLE 2

| reference numeral | Meaning |
| --- | --- |
| 332 | content of second half of first input vector (vec A) to second vector permute subunit |
| 334 | content of second half of second input vector (vec B) to second vector permute subunit |
| 336 | 2$^{nd}$ half of control vector |
| 338 | control signal for second x-bar 118' |
| 340 | data signal at data path 120' |
| 342 | control signal for the first x-bar 108' |
| 344 | TSV data from contact sub-fields 106' to 116 |
| 346 | control signal for third x-bar 126' |
| 348 | output signal of third x-bar 126' |
| 350 | control signal of 2:1 output multiplexer 122' |
| 352 | result 124' of second vector permute subunit |

In FIG. 1, a result vector (also referred to as a combined result) comprising results 124, 124' of output multiplexers 122, 122' has elements of both the first input vector 'vec A' and the second input vector 'vec B'.

Table 3 shows how the bytes of the first and the second input vectors are intermixed or permuted.

TABLE 3

| Byte of result vector | respective content relate to the following but of the input vectors |
| --- | --- |
| 0 | byte 0 of 1$^{st}$ input vector |
| 1 | byte 1F of 2$^{nd}$ input vector, i.e., byte F of the 2$^{nd}$ input vector for the 2$^{nd}$ vector permute subunit |
| 2 | byte 1 of 1$^{st}$ input vector |
| 3 | byte (1F-1) of 2$^{nd}$ input vector, i.e., byte (F-1) of 2$^{nd}$ input vector for the 2$^{nd}$ vector permute subunit |
| 4 | byte 2 of 1$^{st}$ input vector, |
| 5 | byte (1F-2) of 2$^{nd}$ input vector, i.e., byte (F-2) of 2$^{nd}$ input vector for the 2$^{nd}$ vector permute subunit |
| 6 | byte 3 of 1$^{st}$ input vector |
| ... | etc. |
| F | byte (1F-7) of 2$^{nd}$ input vector |
| 10 | byte 0 of 1$^{st}$ input vector |
| 12 | byte 2 of 2$^{nd}$ input vector |
| 11 to 17, 19 | byte 18, byte 1A to 1F of 2$^{nd}$ input vector |
| 18 | byte 1F from 1$^{st}$ input vector |
| 1A to 1F | Byte 18 to 1D of 1$^{st}$ input vector |

It should be noted that the control vectors for all crossbars are not 128 bits wide in this case (since, for example, a 32:1 multiplexer controls five bits out of eight bits per 32:1 byte multiplexer). In this case, the control vector of second crossbar 118, 118' efficiently uses eighty bits (i.e., 5*16=80). The control vector for the first crossbars (17:1) 108, 108' also efficiently uses eighty bits. The control vector of third crossbars (16:1) 126, 126' uses 64 bits (i.e., 4*16=64). The 2:1 multiplexers 122, 122' used sixteen bits (i.e., 1*16=16). However, from the architecture point of view, effectively, 6 bits per byte for a 256 bit wide permutation is used, since 512 bits (concatenation of 'vec A' and 'vec B') represents 64 bytes which can be adjusted to every target byte. In one or more embodiments, the complete control vector information is used in every vector permute subunit and, as such, one-hundred ninety-two bits (((6*32)−96)*2=192) per vector permute subunit are used for the control vector in total.

Accordingly, a three-dimensional (3D) permute unit for a single-instruction multiple-data (SIMD) processor has been disclosed herein.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product (e.g., in the form of design files) embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A three-dimensional (3D) permute unit for a single-instruction-multiple-data stacked processor, the 3D permute unit comprising:
    a first vector permute subunit;
    a second vector permute subunit, wherein the first and second vector permute subunits are arranged in different layers of a 3D chip package, wherein the vector permute subunits are each configured to process a portion of at least two input vectors;
    a first contact sub-field of the first vector permute subunit configured to connect output ports of a first crossbar of the first vector permute subunit, holding an intermediate result of the first vector permute subunit, to a second contact sub-field of the second vector permute subunit;
    a first contact sub-field of the second vector permute subunit configured to connect output ports of a first crossbar of the second vector permute subunit, holding an intermediate result of the second vector permute subunit, to a second contact sub-field of the first vector permute subunit, wherein the first crossbar of the first vector permute subunit is connected to a first input port and a second input port of the first vector permute subunit on one side and the first contact sub-field of the first vector permute unit on an opposite side, and wherein the first crossbar of the second vector permute subunit is connected to a first input port and a second input port of the second vector permute subunit on one side and the first contact sub-field of the second vector permute subunit on an opposite side, where the first contact sub-field of the first vector permute subunit and the second contact sub-field of the second vector permute subunit are connected via a first set of electrical contacts, and where the first contact sub-field of the second vector permute subunit and the second contact sub-field of the first vector permute subunit are connected via a second set of electrical contacts such that the input vectors are partially processed in the first vector permute subunit and partially processed in the second vector permute subunit to provide a combined result for the 3D permute unit.

2. The 3D permute unit of claim 1, wherein each of the input vectors is 256 bits wide.

3. The 3D permute unit of claim 1, wherein the first vector permute subunit includes a second crossbar arranged between the first input port and the second input port of the first vector permute subunit on one side and a first input port of an output multiplexer of the first vector permute subunit on an opposite side.

4. The 3D permute unit of claim 1, wherein the second vector permute subunit includes a second crossbar arranged between the first input port and the second input port of the second vector permute subunit on one side and a first input port of an output multiplexer of the second vector permute subunit on an opposite side.

5. The 3D permute unit of claim 1, wherein the first vector permute subunit includes a third crossbar arranged between the second contact sub-field of the first vector permute subunit and a second input port of the output multiplexer of the first vector permute subunit.

6. The 3D permute unit of claim 1, wherein the second vector permute subunit includes a third crossbar arranged between the second contact sub-field of the second vector permute subunit and a second input port of the output multiplexer of the second vector permute subunit.

7. The 3D permute unit of claim 1, wherein the first input port of the first vector permute subunit is configured to receive a lower half of bits of a first of the input vectors and the second input port of the first vector permute subunit is configured to receive a lower half of bits of a second of the input vectors.

8. The 3D permute unit of claim 7, wherein the first input port of the second vector permute subunit is configured to receive an upper half of bits of the first of the input vectors and the second input port of the second vector permute subunit is configured to receive an upper half of bits of the second of the input vectors.

9. The 3D permute unit of claim 1, wherein the first crossbar of the first vector permute subunit is configured to receive 'i' bytes from the first input port of the first vector permute subunit and (k+1−i) bytes from the second input port of the first vector permute subunit, wherein i=1, . . . , 16 and 'k' equals one-half of the vector length in bytes, resulting in a one byte input signal for the first contact sub-field of the first vector permute subunit.

10. The 3D permute unit of claim 1, wherein an output port of the output multiplexer of the first vector permute subunit holds a result a lower half of bits of a vector permute operation of the input vectors and an output port of the output multiplexer of the second vector permute subunit holds a result an upper half of bits of the vector permute operation of the input vectors.

11. A data processing system, comprising:
a memory; and
a processor couple to the memory, the processor comprising:
a first vector permute subunit;
a second vector permute subunit, wherein the first and second vector permute subunits are arranged in different layers of a 3D chip package, wherein the vector permute subunits are each configured to process a portion of at least two input vectors;
a first contact sub-field of the first vector permute subunit configured to connect output ports of a first crossbar of the first vector permute subunit, holding an intermediate result of the first vector permute subunit, to a second contact sub-field of the second vector permute subunit;
a first contact sub-field of the second vector permute subunit configured to connect output ports of a first crossbar of the second vector permute subunit, holding an intermediate result of the second vector permute subunit, to a second contact sub-field of the first vector permute subunit, wherein the first crossbar of the first vector permute subunit is connected to a first input port and a second input port of the first vector permute subunit on one side and the first contact sub-field of the first vector permute unit on an opposite side, and wherein the first crossbar of the second vector permute subunit is connected to a first input port and a second input port of the second vector permute subunit on one side and the first contact sub-field of the second vector permute subunit on an opposite side, where the first contact sub-field of the first vector permute subunit and the second contact sub-field of the second vector permute subunit are connected via a first set of electrical contacts, and where the first contact sub-field of the second vector permute subunit and the second contact sub-field of the first vector permute subunit are connected via a second set of electrical contacts such that the input vectors are partially processed in the first vector permute subunit and partially processed in the second vector permute subunit to provide a combined result for the 3D permute unit.

12. The system of claim 11, wherein each of the input vectors is 256 bits wide.

13. The system of claim 11, wherein the first vector permute subunit includes a second crossbar arranged between the first input port and the second input port of the first vector permute subunit on one side and a first input port of an output multiplexer of the first vector permute subunit on an opposite side.

14. The system of claim 11, wherein the second vector permute subunit includes a second crossbar arranged between the first input port and the second input port of the second vector permute subunit on one side and a first input port of an output multiplexer of the second vector permute subunit on an opposite side.

15. The system of claim 11, wherein the first vector permute subunit includes a third crossbar arranged between the second contact sub-field of the first vector permute subunit and a second input port of the output multiplexer of the first vector permute subunit.

16. The system of claim 11, wherein the second vector permute subunit includes a third crossbar arranged between the second contact sub-field of the second vector permute subunit and a second input port of the output multiplexer of the second vector permute subunit.

17. The system of claim 11, wherein the first input port of the first vector permute subunit is configured to receive a lower half of bits of a first of the input vectors and the second input port of the first vector permute subunit is configured to receive a lower half of bits of a second of the input vectors.

18. The system of claim 17, wherein the first input port of the second vector permute subunit is configured to receive an upper half of bits of the first of the input vectors and the second input port of the second vector permute subunit is configured to receive an upper half of bits of the second of the input vectors.

19. The system of claim 11, wherein the first crossbar of the first vector permute subunit is configured to receive 'i' bytes from the first input port of the first vector permute subunit and (k+1−i) bytes from the second input port of the first vector permute subunit, wherein i=1, . . . , 16 and 'k' equals one-half of the vector length in bytes, resulting in a one byte input signal for the first contact sub-field of the first vector permute subunit.

20. The system of claim 11, wherein an output port of the output multiplexer of the first vector permute subunit holds a result a lower half of bits of a vector permute operation of the input vectors and an output port of the output multiplexer of the second vector permute subunit holds a result an upper half of bits of the vector permute operation of the input vectors.

21. A method for width expansion of input vectors from a first vector length to a second vector length for a 3D permute unit of a single-instruction-multiple-data stacked processor, wherein the second vector length is twice as long as the first vector length, the method comprising:
arranging a first vector permute subunit and a second vector permute subunit in different layers of a three-dimensional (3D) chip package, wherein the first and second vector permute subunits are configured to process a portion of several input vectors;
connecting output ports of a first crossbar of the first vector permute subunit, holding intermediate results of the first crossbar of the first vector permute subunit, via a first contact sub-field of the first vector permute subunit to a second contact sub-field of the second vector permute subunit;
connecting output ports of a first crossbar of the second vector permute subunit, holding intermediate results of the first crossbar of the second vector permute subunit, via a first contact sub-field of the second vector permute subunit to a second contact sub-field of the first vector permute subunit;
arranging the first crossbar of the first vector permute subunit between a first input port and a second input port of the first vector permute subunit on one side and the first contact sub-field of the first vector permute subunit on an opposite side; and
arranging the first crossbar of the second vector permute subunit between a first input port and a second input port of the second vector permute subunit on one side and the first contact sub-field of the second vector permute subunit on an opposite side, wherein the first contact sub-field of the first vector permute subunit and the second contact sub-field of the second vector permute subunit are connected via a first set of electrical contacts, and wherein the first contact sub-field of the second vector permute subunit and the second contact sub-field of the first vector permute subunit are connected via a second set of electrical contacts such that the input vectors are partially processed in the first vector permute subunit and partially processed in the second vector permute subunit to provide a combined result for the 3D permute unit.

* * * * *